US005431849A

United States Patent [19]

Damhus et al.

[11] Patent Number: 5,431,849

[45] Date of Patent: Jul. 11, 1995

[54] BLEACHING DETERGENT COMPOSITION CONTAINING ACYLATED SUGAR BLEACH ACTIVATORS

[75] Inventors: Ture Damhus; Ole Kirk, both of Copenhagen, Denmark; Frederick E. Hardy, Newcastle-on-Tyne, Great Britain

[73] Assignee: Novo Nordisk A/S, Bagsvaerd, Denmark

[21] Appl. No.: 720,538

[22] PCT Filed: Jan. 22, 1990

[86] PCT No.: PCT/DK90/00022

§ 371 Date: Jun. 19, 1991

§ 102(e) Date: Jun. 19, 1991

[87] PCT Pub. No.: WO90/08182

PCT Pub. Date: Jul. 26, 1990

[30] Foreign Application Priority Data

Jan. 23, 1989 [DK] Denmark ............................ 0277/89

[51] Int. Cl.$^6$ ............................................. C09K 3/00

[52] U.S. Cl. ......................... 252/186.38; 252/186.39; 252/95; 252/186.43

[58] Field of Search ................ 252/94, 186.29, 186.42, 252/186.38; 127/64, 53

[56] References Cited

U.S. PATENT DOCUMENTS

| | | | |
|---|---|---|---|
| 3,901,819 | 8/1975 | Nakagawa et al. | 252/186 |
| 4,283,301 | 8/1981 | Diehl | 252/102 |
| 4,486,327 | 12/1984 | Murphy et al. | 252/94 |
| 4,539,130 | 9/1985 | Thompson et al. | 252/94 |
| 4,800,038 | 1/1989 | Broze et al. | 252/174.17 |
| 4,842,765 | 6/1989 | Satomi | 252/186.26 |
| 4,889,651 | 12/1989 | Broze | 252/95 |
| 5,047,168 | 9/1991 | Broze et al. | 252/174.17 |

FOREIGN PATENT DOCUMENTS

| | | |
|---|---|---|
| 0095904 | 12/1983 | European Pat. Off. . |
| 0325100 | 7/1989 | European Pat. Off. . |
| 0325109 | 7/1989 | European Pat. Off. . |
| 0325124 | 7/1989 | European Pat. Off. . |
| 0325184 | 7/1989 | European Pat. Off. . |
| 836988 | 6/1960 | United Kingdom . |
| 864798 | 4/1961 | United Kingdom . |
| WO88/10147 | 12/1988 | WIPO . |
| 8901480 | 2/1989 | WIPO . |

OTHER PUBLICATIONS

*Chemical and Biochemical Studies on Carbohydrate Esters II Antitumor Activity of Saturated Fatty Acids and Their Ester Derivatives Against Ebiligh Ascites Carcinoma,* Nishikawa et al., Faculty of Pharmaceutical Sciences et al. Jun. 17, 1975.

*Primary Examiner*—Richard D. Lovering
*Assistant Examiner*—Joseph D. Anthony
*Attorney, Agent, or Firm*—Steve T. Zelson; Elias J. Lambiris

[57] ABSTRACT

Esters of monosaccharides and their lower alkyl glycosides are effective both as suffactants and as bleach activators (peracid precursors). The compounds are non-toxic and biodegradable. They act as nonionic surfactants and are effective in soil removal from textiles, e.g. of fatty soiling. In the presence of a hydrogen peroxide source, the sugar derivatives are perhydrolyzed during the washing process to form long-chain peracid. This enhances the bleaching effect, especially on hydrophobic stains.

23 Claims, No Drawings

BLEACHING DETERGENT COMPOSITION CONTAINING ACYLATED SUGAR BLEACH ACTIVATORS

CROSS-REFERENCE TO RELATED APPLICATIONS

This application is a continuation of PCT/DK90/00022 filed Jan. 22, 1990, which is incorporated herein by reference.

TECHNICAL FIELD

This invention relates to a bleaching detergent composition, a washing and bleaching liquor, and a washing and bleaching process. More particularly, these comprise a source of hydrogen peroxide and a bleach activator.

BACKGROUND ART

It is well known that detergents comprising peroxygen bleaches such as sodium perborate (PB) or sodium percarbonate (PC) are effective in removing stains from textiles. It is also known that the bleaching effect at temperatures below 50° C. can be increased by using a peracid precursor (bleach activator), such as tetraacetylethylenediamine (TAED), nonanoyloxybenzenesulfonate (NOBS), or pentaacetylglucose (PAG), which are perhydrolyzed to form a peracid as the active bleaching species, leading to improved bleaching effect.

It is the object of the invention to provide such compositions containing a non-toxic, biodegradable compound that functions both as a bleach activator and as a surfactant. None of the known bleach activators are effective surfactants under practical washing conditions, and no reference appears to have disclosed or suggested the use of any surface-active compound as a bleach activator.

STATEMENT OF THE INVENTION

We have surprisingly found that certain sugar derivatives are effective both as surfactants and as bleach activators (peracid precursors). The compounds are non-toxic and biodegradable. They act as nonionic surfactants and are effective in soil removal from textiles, e.g. of fatty soiling. In the presence of a hydrogen peroxide source, the sugar derivatives are perhydrolyzed to form long-chain peracid, thereby acting as a bleach activators which are particularly effective on hydrophobic stains.

Accordingly, the invention provides a bleaching detergent composition comprising a source of hydrogen peroxide and a $C_6$–$C_{20}$ fatty acyl mono- or diester of a hexose or pentose or of a $C_1$–$C_4$ alkyl glycoside thereof. The invention also provides a washing and bleaching liquor and a washing and bleaching process using these compounds.

JP-A 55-102,697 discloses a cleaning and bleaching agent containing sodium percarbonate and sucrose fatty acid ester, particularly a mixture of mono- and diesters of sucrose with palmitic, stearic, oleic or lauric acid. Data in said reference demonstrate that addition of the sucrose fatty acid ester improves the removal of fatty soiling but the reference is silent on the effect of the sucrose ester on bleaching. Data presented later in this specification demonstrate that the esters used in this invention are superior as bleach activators to the sucrose esters used in the reference.

DETAILED DESCRIPTION OF THE INVENTION

Hydrogen peroxide source

The composition of the invention comprises a hydrogen peroxide source as a bleaching agent, i.e. a compound that generates hydrogen peroxide in an aqueous solution of the detergent. Examples are hydrogen peroxide, perborates such as sodium perborates and percarbonates such as sodium percarbonate.

Sugar derivative

The sugar derivative used in the invention has the general formula $$(R—CO)_nX\,R'_y$$

wherein

X is a pentose or hexose sugar moiety,
R—CO is a $C_6$–$C_{20}$ fatty acyl group,
n is 1 or 2,
R' is a $C_1$–$C_4$ alkyl group, and
y is 0 or 1,
whereby
the alkyl group (if present) is attached through a glycosidic bond, and
the acyl group(s) is (are) attached through ester bond(s).

The fatty acyl group may be saturated, mono- or poly-unsaturated; straight-chain or branched-chain, preferably $C_6$–$C_{12}$. Some preferred acyl groups are hexanoyl, heptanoyl, octanoyl, nonanoyl, decanoyl, undecanoyl, dodecanoyl, and oleoyl. Sugar derivatives with these acyl groups combine good surfactant properties with good bleach activation.

The sugar moiety is preferably an aldohexose or aldopentose. For reasons of economy, glucose or xylose derivatives are preferred.

Esters of the pentose or hexose itself or of a methyl or ethyl glycoside thereof are preferred as they have good surfactant properties.

Hexose derivatives with a single acyl group attached to the 6-position are preferred as they may be conveniently prepared and are particularly preferred when a relatively slow perhydrolysis is desired so as to extend the surfactant effect. Similarly, other sugar derivatives with a single acyl group attached to a C atom other than the anomeric may also be preferred when a relatively slow perhydrolysis is desired, i.e. ketose derivatives with an acyl group in the 1-, 3-, 4- or 5-position and aldose derivatives with an acyl group in the 2-, 3- or 4-position.

Sugar derivatives with the acyl group in the anomeric position (i.e. the 1-position of an aldose or the 2-position of a ketose) give particularly fast perhydrolysis. They are preferred when it is desired to have maximum bleach activation in the shortest possible time.

A mixture of several compounds may be used for better performance or due to economy of preparation, e.g. a mixture of mono- and diester or a mixture of compounds with different acyl groups.

The sugar derivatives used in the invention may be prepared by methods known in the art. Reference is made to WO 89/01480; D. Plusquellec et al., Tetrahedron, Vol. 42, pp. 2457–2467, 1986; D. Plusquellec, Tetrahedron Letters, Vol. 28, No. 33, pp. 3809–3812, 1987; J. M. Williams et al., Tetrahedron, 1967, Vol. 23, pp. 1369–1378; and A. H. Haines, Adv. Carbohydr.

Chem., Vol. 33, pp. 11–51, 1976. In cases where these methods lead to mixtures of isomers, these may, if so desired, be separated by chromatography on silica gel.

Bleaching detergent composition

The peroxide bleach and the sugar derivative (bleach activator) are preferably mixed in a molar ratio of 1:10 to 20:1, preferably 1:1 to 10:1.

The amount of peroxide bleach in the composition is preferably 1–90% by weight, most preferably 5–20% (as PB monohydrate). The amount of bleach activator is preferably 2–90%, e.g. 2–50%, especially 5–30%, or it may be 5–90%, especially 10–30% (percentages by weight).

The esters used in the invention are effective as non-ionic surfactants. In addition, the composition of the invention may comprise other surfactants, e.g. of the non-ionic and/or anionic type. Examples of nonionics are alcohol ethoxylates, nonylphenol ethoxylates and alkyl glycosides. Examples of anionics are linear alkylbenzenesulfonates (LAS), fatty alcohol sulfates, fatty alcohol ether sulfates (AES), $\alpha$-olefinsulfonates (AOS), and soaps.

Further, the composition of the invention may contain other conventional detergent ingredients such as suds-controlling agents, foaming boosters, chelating agents, ion exchangers, alkalis, builders, cobuilders, other bleaching agents, bleach stabilizers, fabric softeners, antiredeposition agents, enzymes, optical brighteners, anticorrosion agents, fragrances, dye-stuffs and blueing agents, formulation aids, fillers and water.

The composition of the invention may be provided in liquid form or in powder or granular form. It may be formulated in analogy with the frame formulations for powder detergents given at p. 288 of J. Falbe: Surfactants in Consumer Products. Theory, Technology and Application, Springer-Verlag 1987, by replacing all or part (e.g. 50%) of the non-ionic surfactant with ester according to the invention.

Liquor and process for washing and bleaching

The washing and bleaching liquor of the invention can be obtained by dissolving the above-described detergent in water, or the ingredients can be added and dissolved separately. Typically, the total detergent concentration will be 1–20 g/l, the amount of the hydrogen peroxide source will be 0.05–5 g/l, especially 0.25–1 g/l (calculated as sodium perborate monohydrate), and the amount of the sugar derivative will be 0.1–2.5 g/l, especially 0.25–1.5 g/l.

The washing and bleaching process of the invention is typically carried out with the above-described liquor at temperatures of 20°–60° C. for 10–60 minutes in a conventional washing machine.

EXAMPLES

The test swatches used were prepared by homogeneously soiling cotton cloth with tea, red wine, or grass juice, and then air-drying the soiled cloth overnight in the dark. The resulting material was stored in the dark at 4° C. (tea, red wine) or below 0° C. (grass) for at least 2 weeks before cutting swatches.

All glycolipids prepared by us were purified by chromatography on silica gel (using a gradient of hexane/ethyl acetate/methanol), and satisfactory $^1$H NMR spectra were obtained.

EXAMPLE 1

In a Terg-O-tometer washing trial, cotton swatches homogeneously soiled with red wine or grass juice were subjected to 6 different washing liquors for 30 min at 40° C. Water hardness was 9° dH (equivalent to ca. 1.6 mM $Ca^{2+}$), and the basis detergent was composed as follows:

| | |
|---|---|
| $Na_2SO_4$ | 2.00 g/l |
| Zeolite A | 1.25 g/l |
| $Na_2CO_3$ | 0.50 g/l |
| Nitrilotriacetic acid | 0.50 g/l |
| $Na_2SiO_3 \cdot 5H_2O$ | 0.40 g/l |
| Ethylenediaminetetraacetic acid | 0.01 g/l |
| Carboxymethylcellulose | 0.05 g/l |

Initially, pH was adjusted to 10.5, and it dropped in all cases to somewhere between 9.8 and 10.2 during the wash.

The textile:liquor ratio was circa 4 g/l in the red-wine experiment and circa 2 g/l in the grass experiment.

The 6 washing liquors were composed as follows:

Soln. 1: basis detergent alone
2: 3.0 g/l glucose-6-octanoate (Glu-$C_8$)
3: 2.0 g/l $NaBO_3.4H_2O$ (PB4)
4: 2.0 g/l PB4+0.4 g/l tetraacetylethylenediamine (TAED)
5: 2.0 g/l PB4+1.0 g Glu-$C_8$
6: 2.0 g/l PB4+3.0 g Glu-$C_8$ After being washed, the swatches were rinsed thoroughly in tap water and air-dried in the dark overnight.

The bleaching effect of the 6 washing liquors was evaluated by measuring the remission of the swatches at 460 nm with a Datacolor Elrephometer 2000. The results were (average of two performances, standard deviations on last: digit in parenthesis):

| Clean textile | | Remission at 460 nm (%) 85.1 (1) | |
|---|---|---|---|
| | | Red wine | Grass |
| Reference | Unwashed | 48.5 (1) | 35.2 (1) |
| Reference | Soln. 1 | 56.2 (3) | 44.7 (1) |
| Reference | Soln. 2 | 57.0 (1) | 45.1 (9) |
| Reference | Soln. 3 | 63.5 (5) | 45.7 (0) |
| Reference | Soln. 4 | 71.6 (5) | 46.8 (1) |
| Invention | Soln. 5 | 67.7 (7) | 55.6 (5) |
| Invention | Soln. 6 | 72.2 (6) | 62.9 (6) |

The above data demonstrate that a fairly standard dose of perborate can be boosted some 15 remission units by adding a glycolipid, an effect which is larger than that obtained with a rather large dose of 0.4 g/l TAED. A dose of 1.0 g/l glycolipid is not unreasonable considering that the substance is also a surfactant. It may furthermore be noted that 0.4 g TAED theoretically releases 3.5 mmol peracetic acid (2 moles per mole TAED), while 1.0 g Glu-$C_8$ theoretically releases 3.3 mmol peroctanoic acid.

EXAMPLE 2

In a Terg-O-tometer washing trial, cotton swatches homogeneously soiled with grass juice and tea were subjected to increasing doses of Glu-$C_8$ (cf. Example 1). Duration, temperature, water hardness and initial pH were as in Example 1. The grass and tea swatches were washed together with a total textile:liquor ratio of 4 g/l. The basis detergent was as in Example 1 with an added amount of linear alkylbenzenesulfonate (sodium salt, mean chain length of alkyl group=12) of 0.6 g/l. The swatches were rinsed and evaluated by remission measurements as in Example 1. The results were as follows:

| Clean textile | Remission at 460 nm (%) 84.5 (5) | |
|---|---|---|
| | Tea | Grass |
| Unwashed | 47.2 | 35.3 |
| Basis detergent (b.d.) | 45.0 | 63.5 |
| B.d. + 2.0 g/l PB4 | 54.0 | 73.3 |
| B.d. + 2.0 g/l PB4 + 0.2 g/l Glu-$C_8$ | 56.7 | 79.1 |
| B.d. + 2.0 g/l PB4 + 0.4 g/l Glu-$C_8$ | 57.6 | 78.9 |
| B.d. + 2.0 g/l PB4 + 0.6 g/l Glu-$C_8$ | 59.3 | 78.1 |
| B.d. + 2.0 g/l PB4 + 0.8 g/l Glu-$C_8$ | 60.1 | 78.7 |
| B.d. + 2.0 g/l PB4 + 1.2 g/l Glu-$C_8$ | 60.6 | 79.4 |
| B.d. + 2.0 g/l PB4 + 2.4 g/l Glu-$C_8$ | 63.9 | 80.3 |

The results show that with grass soiling, a substantial bleach activation is achieved at 0.2 g/l Glu-$C_8$, larger doses giving more or less the same effect. With tea, there is initially an almost linear relation between Glu-$C_8$concentration and bleaching effect. In all, a noticeable effect is obtained already at low doses.

EXAMPLE 3

In a Terg-O-tometer washing trial, The action of Glu-$C_8$ was compared to that of Glu-$C_{12}$ (=glucose-6-dodecanoate) and Sucr-$C_{12}$ (=sucrose-dodecanoate). The latter was the commercially available mixture L1695 of lauric esters of sucrose from Ryoto.

Washing, rinsing, and swatch evaluation were carried out as in Example 2, except that a second performance was carried out with an equivalent amount of percarbonate $2Na_2CO_3.3H_2O_2$) instead of PB4. The results were as follows:

| Clean textile | Remission at 460 nm (%) (Percarbonate results in parenthesis) 84 | |
|---|---|---|
| | Tea | Grass |
| Unwashed | 49.4 | 35.6 |
| Basis detergent (b.d.) | 47.2 (47.4) | 64.8 (64.0) |
| B.d. + PB4 (percarbonate) | 56.7 (53.0) | 73.6 (74.6) |
| B.d. + PB4 + 8.5 mM Glu-$C_8$ *) | 64.8 (62.7) | 81.5 (83.2) |
| B.d. + PB4 + 8.5 mM Glu-$C_{12}$ | 57.1 (53.0) | 78.7 (81.7) |
| B.d. + PB4 + 8.5 mM Sucr-$C_{12}$ *) | 58.4 (54.3) | 79.0 (79.6) |

*) By weight, 2.6 g/l Glu-$C_8$, 3.1 g/l Glu-$C_{12}$, and 4.8 g/l of the L1695 product.

These results demonstrate that Glu-$C_8$ is superior to Glu-$C_{12}$ as well as Sucr-$C_{12}$ on a molar as well as a weight basis with the dosis of Glu-$C_8$ chosen here (8.5 mM is slightly above the critical micelle concentration of Glu-$C_8$ as determined in water).

EXAMPLE 4

This example is concerned with an examination of the hydrogen peroxide activating effect of various esters of some sugars and glycosides in the bleaching of test swatches soiled with tea, red wine, or grass.

The experiments were carried out as small-scale analogues of a Terg-O-tometer washing trial, i.e. isothermally in a series of beakers with concerted stirring (and alternating stirring direction).

The soiled textile was loaded to 9 g/l washing liquor.

All glycolipid preparations were dosed to 2 mM assuming them to be pure monoesters.

The washing liquor employed was a 50 mM sodium carbonate buffer at pH 10.5 with 0.4 g nonionic surfactant/l added (the preparation Berol 160 from Berol Nobel was used, a $C_{12}$–$C_{14}$ fatty alcohol ethoxylate with an EO value of 6). The washing liquor was prepared from demineralized water.

Washing temperature was 40° C. Duration: 30 min.

The swatches were rinsed, dried, and evaluated by remission measurements as in Example 1. The results were as follows:

| | Clean textile | Remission at 460 nm (%) 85 | | |
|---|---|---|---|---|
| | | Red wine | Tea | Grass |
| 0. | Soiled, not washed | 46 | 50 | 43 |
| 1. | Reference (washing liquor alone) | 53 | 50 | 70 |
| 2. | 10 mM $H_2O_2$ in washing liquor | 67 | 64 | 75 |
| 3. | 6-O-octanoylglucose | 73 | 68 | 83 |
| 4. | 3-O-octanoylglucose | 73 | 68 | 82 |
| 5. | 6-O-dodecanoylglucose | 66 | 65 | 78 |
| 6. | 3-O-dodecanoylglucose | 66 | 65 | 80 |
| 7. | 6-O-octanoylgalactose | 70 | 67 | 81 |
| 8. | 6-O-octanoylfructose | 70 | 66 | 79 |
| 9. | 2-O-decanoylxylose | 67 | 66 | 84 |
| 10. | 3-O-decanoylxylose | 67 | 66 | 84 |
| 11. | Methyl 6-O-decanoyl-glucopyranoside | 70 | 67 | 85 |
| 12. | Methyl 2-O-decanoyl-glucopyranoside | 69 | 66 | 83 |
| 13. | Ethyl 6-O-decanoyl-galactopyranoside | 70 | 66 | 80 |
| 14. | Ethyl 6-O-decanoyl-galactofuranoside | 71 | 67 | 80 |

Standard deviations were in all cases below 1 remission unit. Thus, all the glycolipids tested show significant bleach-activating effect on tea and grass soilings, and all but dodecanoylglucose and decanoylxylose preparations also improve the bleaching of red wine. The grass swatches are in several cases bleached completely.

EXAMPLE 5

In this example the hydrogen peroxide activating effect of methyl 6-O-octanoylglucopyranoside (Me-glu-$C_8$) was examined. The experimental conditions were as described in Example 2, only the soiled textile was loaded to 9 g/l washing liquor. As a source of hydrogen peroxide, sodium perborate tetrahydrate (PB4) was used. The results are given below:

| Clean textile | Remission at 460 nm (%) 85 | |
|---|---|---|
| | Tea | Red wine |
| 1. Reference (basis detergent alone) | 53 | 57 |
| 2. Basis detergent + 2.0 g/l PB4 | 62 | 63 |
| 3. As 2. + 1.2 g/l Me—glu—$C_8$ | 65 | 67 |

Again, the difference from 2. to 3. represents a significant activator effect which, considering the stated difference in experimental conditions, may be judged to be roughly equivalent to the effect of glucose-6-octanoate (6-O-octanoylglucose) on red wine in Example 1 and of glucose -6-octanoate on tea in Example 2 (at corresponding levels of glycolipid).

EXAMPLE 6

In this example the hydrogen peroxide activating effect of 2 glycolipids was monitored by the amount of peracid formed in the washing liquor. Peracid formation was monitored by iodometry at 5° C. (as described by Sully and Williams in *Analyst,* 1962, 67, 653). The glycolipids tested were 1-O-octanoyl-β-glucopyranose (1) (obtained from Janssen Chimica) and ethyl 6-O-decanoylglucopyranoside (2).

The experimental conditions were: 0.3% sodium perborate tetrahydrate (19 mM), 0.3% anhydrous sodium carbonate (28 mM) and 0,002% ethylene diaminetetrakis(methylenephosphonic acid) at 40° C. and pH 10.5. The glycolipids were predissolved in a minimum quantity of methanol and added to the perhydrolysis mixture to a concentration of 0.1% (approx 3 mM). The results are given below:

| | Peracid (% of theoretical) | |
|---|---|---|
| Time (min) | 1 | 2 |
| 1 | 45 | 2 |
| 3 | 70 | 3 |
| 10 | 68 | 7 |
| 15 | 68 | 8 |
| 30 | 65 | 8 |

The above data show that both compounds are able to form peracids in perborate solution. Compound 1 should be an extremely efficient activator since as much as 70% of the theoretical peracid has been formed in only 3 minutes under the conditions applied.

We claim:

1. A bleaching detergent composition comprising:

(a) 1–90% by weight, calculated as % sodium perborate monohydrate, of a source of hydrogen peroxide and (b) 5–90% by weight of a compound of formula $(R—CO)_nXR'_y$, wherein X is a penlose or hexose, R—CO is an unsubstituted $C_6$–$C_{20}$ fatty acyl group attached through an ester bond to X, n is 1 or 2, R' is a $C_1$–$C_4$ alkyl group, attached through a glycosidic bond to the anomeric carbon of X, and y is 0 or 1.

2. A composition according to claim 1, wherein y is 0.

3. A composition according to claim 1, wherein y is 1, and R' is selected from the group consisting of methyl and ethyl.

4. A composition according to claim 1, wherein n is 1, X is a hexose, and R—CO is attached to the 6-position of X.

5. A composition according to claim 1, wherein X is an aldose and R—CO is attached to the 2-, 3- or 4-position of X.

6. A composition according to claim 1, wherein n is 1, X is a ketose, and the acyl group is attached to the 1-, 3-, 4- or 5-position of X.

7. A composition according to claim 1, wherein n is 1, y is 0, and R—CO is attached to the anomeric carbon of X.

8. A composition according to claim 1, wherein the hydrogen peroxide source is selected from the group consisting of hydrogen peroxide, perborates, and percarbonates.

9. A composition according to claim 1, wherein the hydrogen peroxide source and the compound of formula $(R—CO)_nXR'_y$ are present at a molar ratio of from 1:10 to 20:1.

10. A composition according to claim 1, wherein the compound is the sole bleach activator.

11. A composition according to claim 1, wherein the compound is the sole nonionic surfactant.

12. A composition according to claim 1 which is a washing and bleaching liquor.

13. A composition according to claim 1, wherein y is 1.

14. A composition according to claim 1, wherein said compound is selected from the group consisting of 6-O-octanoyl-glucose and 6-O-dodecanoyl-glucose.

15. A composition according to claim 1, wherein X is an aldohexose.

16. A composition according to claim 15, wherein the aldohexose is glucose.

17. A composition according to claim 1, wherein said fatty acyl group is selected from the group consisting of hexanoyl, heptanoyl, octanoyl, nonanoyl, decanoyl, undecanoyl, dodecanoyl and oleoyl.

18. A composition according to claim 17, wherein said fatty acyl group is selected from the group consisting of hexanoyl, heptanoyl, octanoyl, nonanoyl, undecanoyl and oleoyl.

19. A composition according to claim 17, wherein said fatty acyl group is decanoyl.

20. A composition according to claim 1, wherein X is a pentose.

21. A composition according to claim 20, wherein the pentose is an aldopentose.

22. A composition according to claim 21, wherein the aldopentose is xylose.

23. A process for washing and bleaching a stained textile, comprising treating the textile in the presence of effective washing and bleaching amounts of a source of hydrogen peroxide and of a compound of formula $(R—CO)_nXR'_y$, wherein X is a pentose or hexose, R—CO is an unsubstituted $C_6$–$C_{20}$ fatty acyl group attached through an ester bond to X, n is 1 or 2, R' is a $C_1$–$C_4$ alkyl group, attached through a glycosidic bond to X, and y is 0 or 1.

* * * * *